United States Patent
Nakamura

(10) Patent No.: US 9,441,635 B2
(45) Date of Patent: Sep. 13, 2016

(54) HEAT-INSULATING BEARING STRUCTURE

(71) Applicant: MITAKA KOHKI CO., LTD., Tokyo (JP)

(72) Inventor: Katsushige Nakamura, Tokyo (JP)

(73) Assignee: MITAKA KOHKI CO., LTD., Tokyo (JP)

( * ) Notice: Subject to any disclaimer, the term of this patent is extended or adjusted under 35 U.S.C. 154(b) by 76 days.

(21) Appl. No.: 14/575,296

(22) Filed: Dec. 18, 2014

(65) Prior Publication Data
US 2015/0176592 A1 Jun. 25, 2015

(30) Foreign Application Priority Data
Dec. 24, 2013 (JP) .................. 2013-265049

(51) Int. Cl.
| | |
|---|---|
| F16C 33/76 | (2006.01) |
| F04D 29/053 | (2006.01) |
| F16C 37/00 | (2006.01) |
| F04D 17/16 | (2006.01) |
| F04D 29/26 | (2006.01) |
| F04D 29/58 | (2006.01) |

(52) U.S. Cl.
CPC ............ *F04D 29/053* (2013.01); *F04D 17/16* (2013.01); *F04D 29/263* (2013.01); *F04D 29/5806* (2013.01); *F04D 29/5853* (2013.01); *F16C 37/007* (2013.01); *F16C 2360/23* (2013.01)

(58) Field of Classification Search
CPC ........ F04D 17/08; F04D 17/16; F04D 29/04; F04D 29/043; F04D 29/046; F04D 29/049; F04D 29/053; F04D 29/056; F04D 29/059; F04D 29/083; F04D 29/104; F04D 29/108; F04D 29/20; F04D 29/263; F04D 29/266; F04D 29/582; F04D 29/5806; F04D 29/5853; F04D 29/5893; F16C 19/50; F16C 37/00; F16C 37/007; F16C 2360/23
USPC .................. 384/476, 627; 415/180; 60/605.3
See application file for complete search history.

(56) References Cited

U.S. PATENT DOCUMENTS

| | | | | |
|---|---|---|---|---|
| 3,267,868 A | * | 8/1966 | Page ..................... | F04D 29/043 |
| | | | | 415/115 |
| 2015/0044077 A1 | * | 2/2015 | Huang .................. | F04D 25/082 |
| | | | | 417/423.8 |
| 2015/0086371 A1 | * | 3/2015 | Avonto ................. | F04D 29/162 |
| | | | | 416/186 R |

FOREIGN PATENT DOCUMENTS

| | | | | |
|---|---|---|---|---|
| DE | 807298 | * | 6/1951 | ......... F04D 29/5853 |
| JP | 2007-9702 | | 1/2007 | |

* cited by examiner

*Primary Examiner* — James Pilkington
(74) *Attorney, Agent, or Firm* — Greenblum & Bernstein P.L.C.

(57) ABSTRACT

A heat-insulating bearing structure employs three disks so that peripheral edges of the disks come into contact with a circumferential side face of a rotary shaft, to support the rotary shaft. A contact part between the rotary shaft and each disk is small, and therefore, heat conduction from the rotary shaft to each disk is small. Accordingly, the bearing structure surely supports the rotary shaft even if the rotary shaft is heated to a high temperature. Each disk is provided with fins so that, when rotated, the fins draw in surrounding air and blow out the air from the peripheral edge of the disk toward the contact part between the disk and the rotary shaft, thereby cooling the contact part and surely supporting the rotary shaft.

3 Claims, 7 Drawing Sheets

HEAT-INSULATING BEARING STRUCTURE

This patent application claims the benefit of priority under 35 USC 119 (a) of Japanese patent application No. 2013-265049, filed on Dec. 24, 2013, the entire disclosed contents of which are incorporated herein by reference.

BACKGROUND OF THE INVENTION

1. Field of the Invention

The present invention relates to a heat-insulating bearing structure.

2. Description of Related Art

A turbine that is revolved by high-temperature gas or a pump that is rotated to discharge high-temperature gas generally employs a structure including a rotary shaft provided with, at one end thereof, an impeller that directly comes into contact with the high-temperature gas and a rolling bearing that rotatably supports the rotary shaft. For example, Japanese Unexamined Patent Application Publication No. 2007-9702 discloses a structure that prevents a temperature increase of the rolling bearing by arranging a water-cooling jacket around the rotary shaft and circulating cooling water through the jacket to cool the periphery of the rotary shaft.

Such a related art that employs the water-cooling jacket for cooling the periphery of a rotary shaft is sometimes unable to secure a sufficiently large cooling area due to the structure of a turbine or pump for which the jacket is provided.

A solar heat utilization field of recent years condenses sunlight to produce high-temperature gas of 1000 degrees centigrade or over, and to transfer the high-temperature gas to a given location, requires a pump that is capable of resisting high temperatures. If such a pump adopts the water-cooling jacket for a whole cooling scheme, the jacket must be too complicated. It is required, therefore, to provide a bearing structure with a novel heat-resistant structure that does not rely on coolant.

To meet the requirement, the present invention is able to provide a heat-insulating bearing structure capable of surely supporting, without relying on water cooling, a rotary shaft of an impeller that comes into contact with high-temperature gas.

SUMMARY OF THE INVENTION

According to a first aspect of the present invention, the heat-insulating bearing structure for supporting a rotary shaft provided with, at one end thereof, an impeller that comes into contact with high-temperature gas includes a set of three disks whose peripheral edges are in contact with a circumferential side face of the rotary shaft from three directions, the three disks being rotatably supported with respective disk-supporting shafts that are in parallel with the rotary shaft, each of the disks having fins to radially blow out atmospheric gas from a peripheral edge of the disk when the disks are rotated.

According to a second aspect of the present invention, each of the disks includes two circular plates that hold the fins between them, the center of one of the circular plates being fixed to the disk-supporting shaft and the center of the other circular plate being provided with an intake hole to draw in atmospheric gas when the disks are rotated.

According to a third aspect of the present invention, the rotary shaft is provided with a small-diameter part at a location corresponding to the peripheral edges of the disks so that the peripheral edges of the disks come into contact with the small-diameter part to restrict a thrust-direction position of the rotary shaft.

DESCRIPTION OF PREFERRED EMBODIMENT

Figure 1:
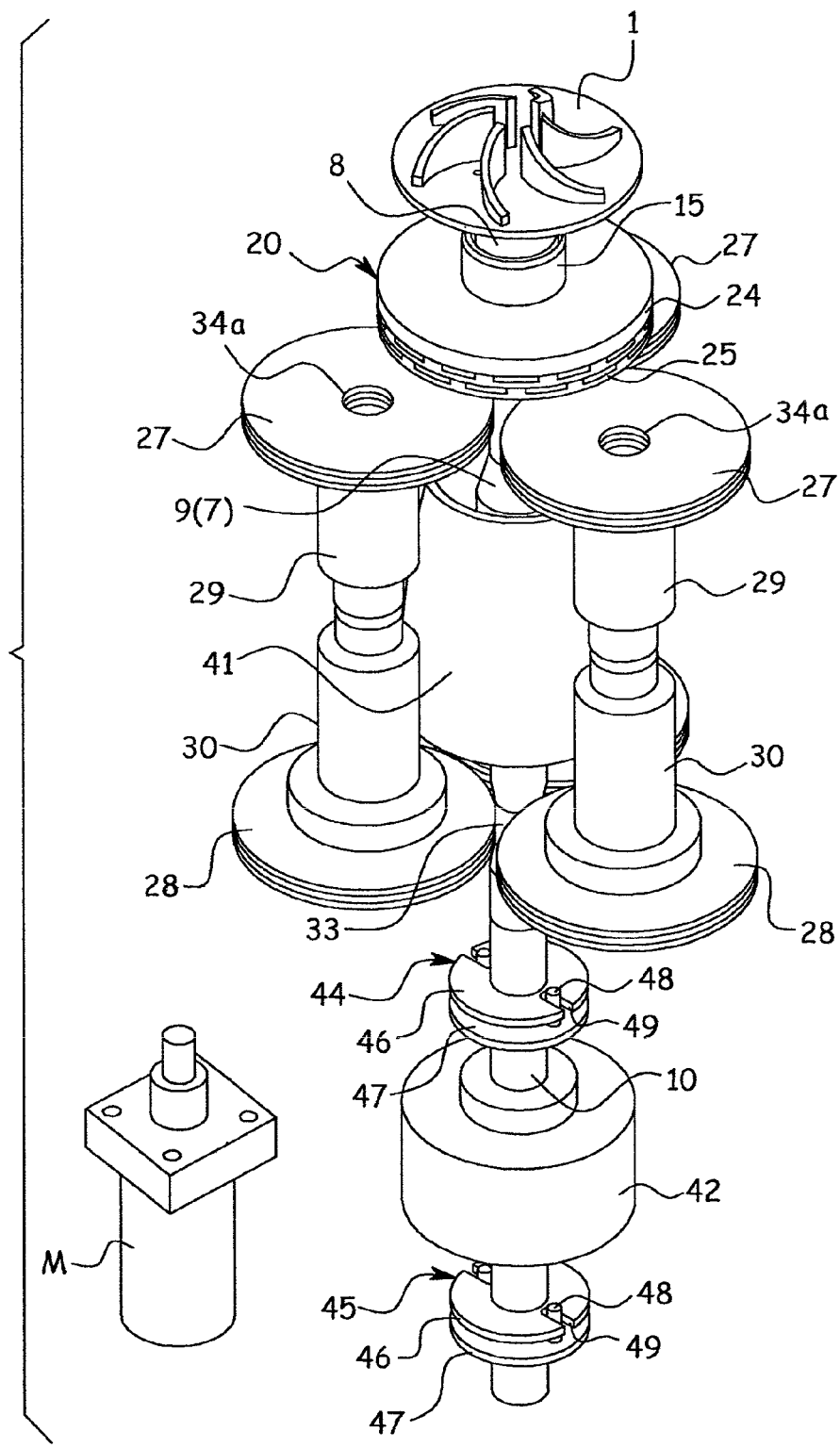
FIG. 1 is a perspective view generally illustrating a heat-insulating bearing structure that is supporting a rotary shaft according to an embodiment of the present invention.
Figure 2:
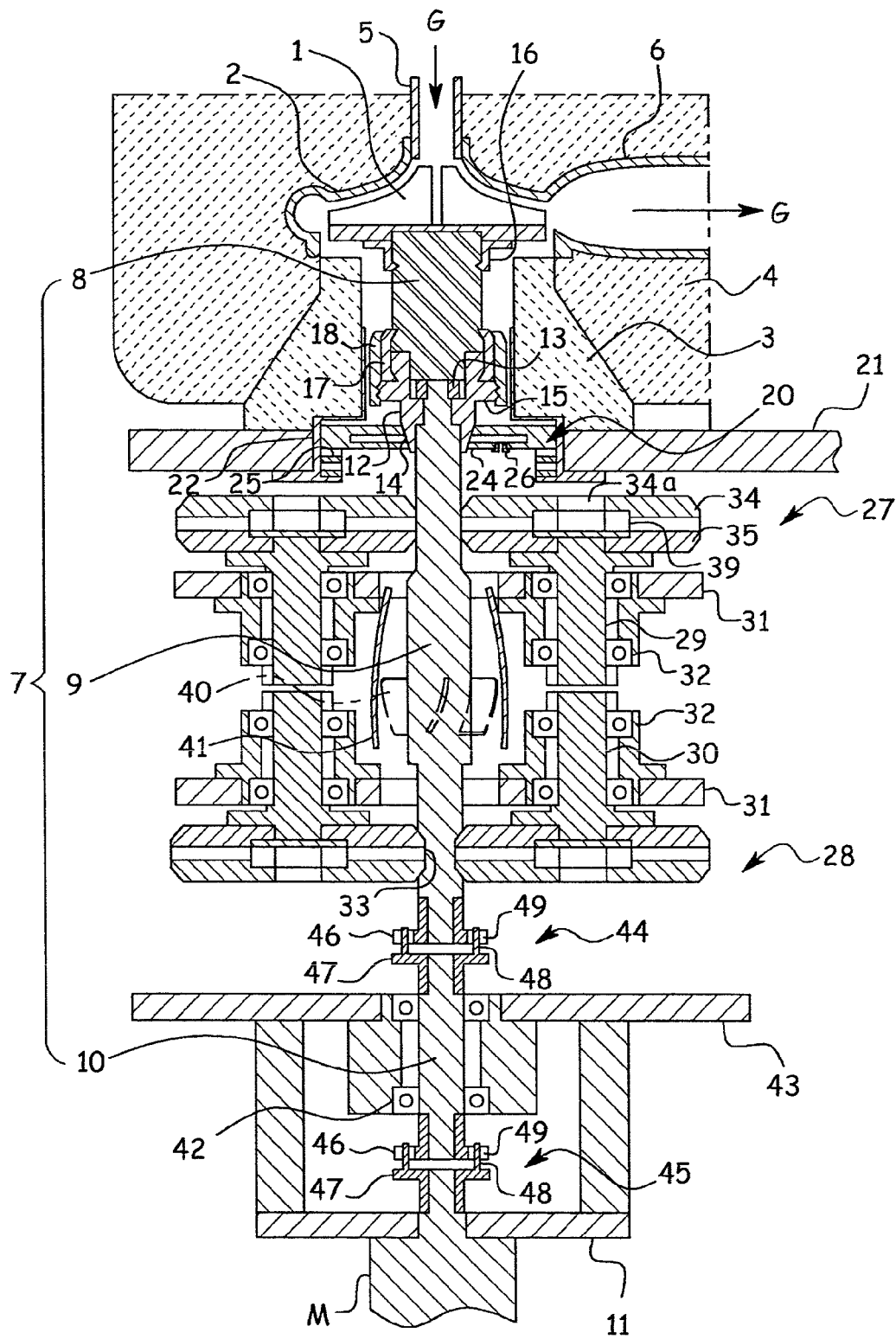
FIG. 2 is a sectional view illustrating the heat-insulating bearing structure taken along a line SA-SA of FIG. 6.
Figure 3:
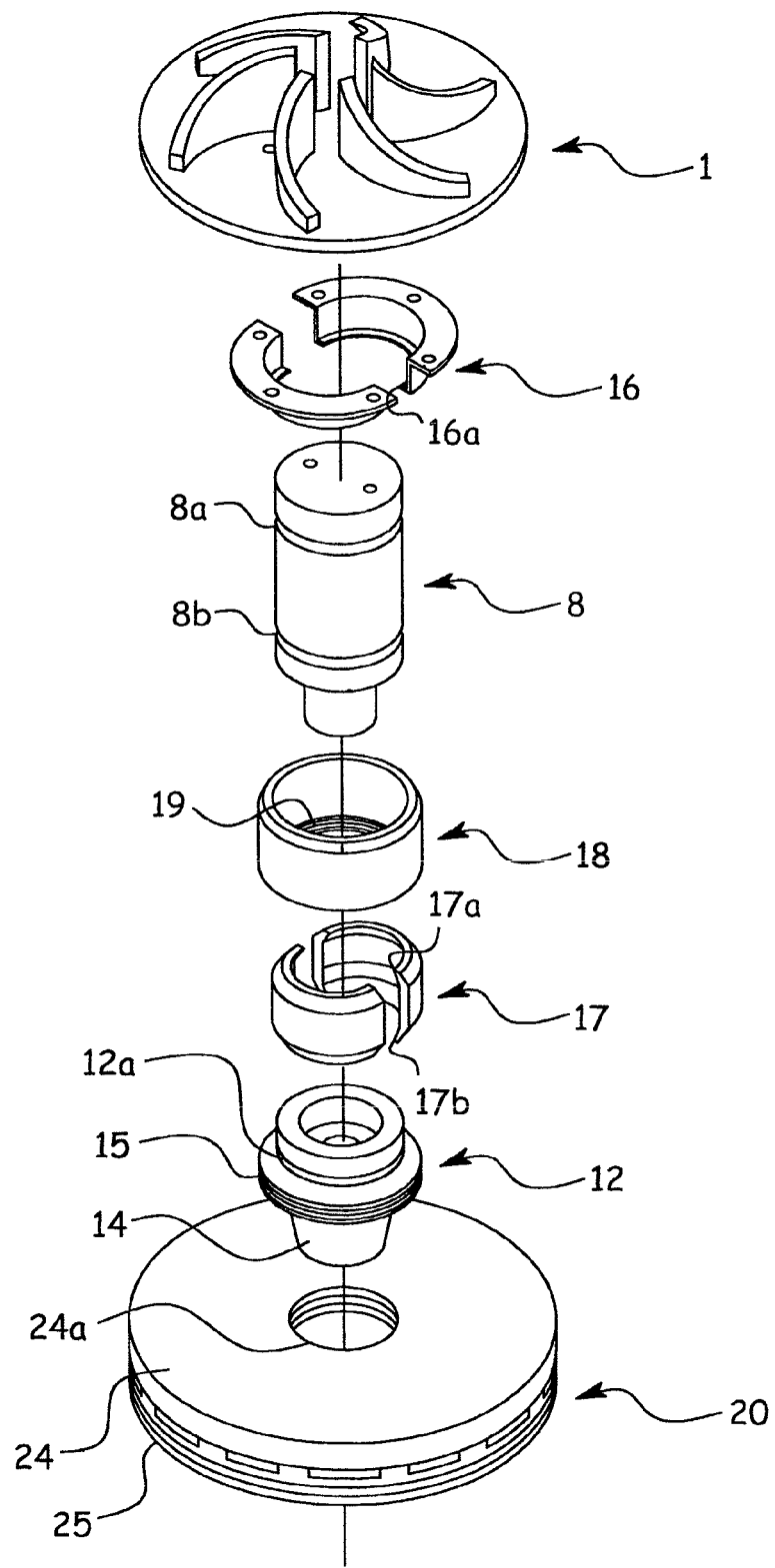
FIG. 3 is an exploded perspective view illustrating a heat-resistant shaft of the rotary shaft.
Figure 4:
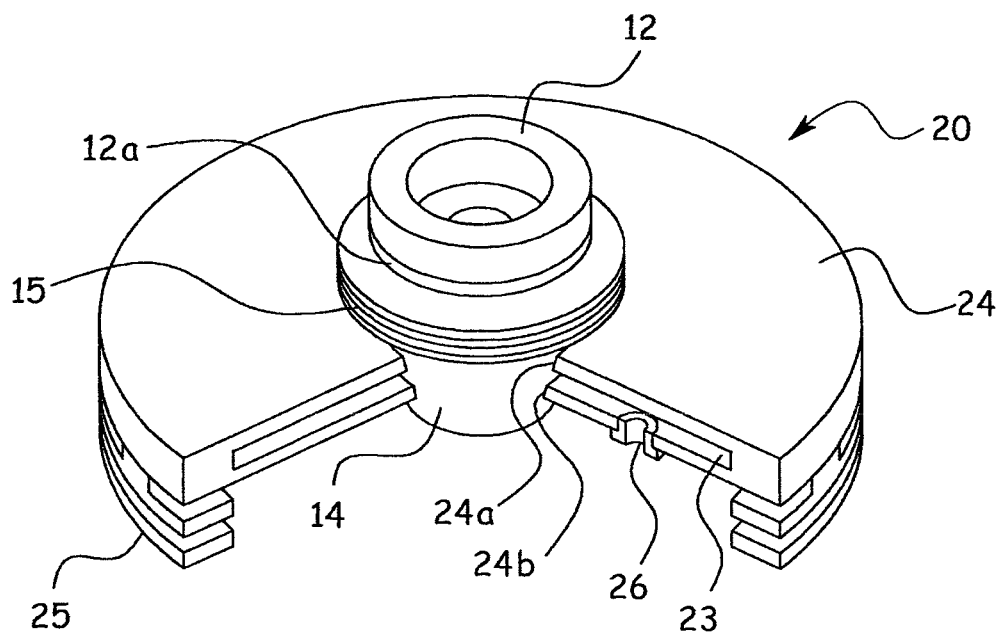
FIG. 4 is a partly broken perspective view illustrating a shutter structure for the rotary shaft.

A heat-insulating bearing structure according to an embodiment of the present invention will be explained with reference to FIGS. 1 to 9.

The heat-insulating bearing structure according to the embodiment is of a vertical type and has an impeller 1 at a top end thereof. The impeller 1 is accommodated in a housing 2. The housing 2 is covered with insulating materials 3 and 4. The insulating material 3 has a tapered shape and is surrounded with the insulating material 4. The two-piece structure of the insulating materials 3 and 4 is employed because a whole lower part including the tapered insulating material 3 is removable when carrying out maintenance.

The impeller 1 functions as a pump when rotated, to draw high-temperature gas G through a suction pipe 5 formed at a central part of the housing 2 into a discharge pipe 6. At this time, the impeller 1 is heated to a high temperature. For this, the impeller 1 is made of heat-resistant metal or ceramics. According to the present embodiment, the high-temperature gas G is air heated by a receiver of a solar concentrating unit (not illustrated) to about 1500 degrees centigrade. The gas G may be inert gas of, for example, nitrogen or argon.

The impeller 1 is fixed to a heat-resistant shaft 8 that is an upper part of a rotary shaft 7. The heat-resistant shaft 8 has a cylindrical shape and is made of ceramics. An intermediate part of the rotary shaft 7 is a rotary shaft body 9 made of metal. A lower part of the rotary shaft 7 is a connection shaft 10 made of metal. The heat-resistant shaft 8 has circumferential V-grooves 8a and 8b that are formed in a circumferential side face of the heat-resistant shaft 8 at upper and lower parts thereof, respectively.

The connection shaft 10 at the lower part of the rotary shaft 7 is connected to a motor M supported on a base 11. The motor M drives the rotary shaft 7 to rotate the impeller 1. The heat-insulating bearing structure according to the present embodiment is characterized to prevent the impeller 1 that is heated to a high temperature from conducting heat through the rotary shaft 7 to the motor M and a peripheral supporting structure.

An upper end of the rotary shaft body 9 is fixed to an adapter 12 with a screw 13. The adapter 12 has a tapered face 14 at a lower part thereof, a screw flange 15 at an intermediate part thereof, and a circumferential V-groove 12a at an upper part thereof.

A two-piece flange 16 is fixed to a bottom face of the impeller 1. The two-piece flange 16 has circumferential hooks 16a and is separately fixed to the impeller 1 so that the hooks 16a engage with the upper V-groove 8a of the heat-resistant shaft 8.

A lower end of the heat-resistant shaft 8 is inserted into the adapter 12 and the heat-resistant shaft 8 is covered with a two-piece cylinder 17. The two-piece cylinder 17 has upper and lower hooks 17a and 17b that engage with the lower V-groove 8b of the heat-resistant shaft 8 and the V-groove 12a of the adapter 12, respectively.

The two-piece cylinder 17 is covered with a cylindrical cap 18. The cap 18 has a screw part 19 to be fastened to the screw flange 15. With the cap 18 covering the two-piece cylinder 17, the two-piece cylinder 17 is never removed from the heat-resistant shaft 8 and adapter 12 and the engagement between the hooks 17a and 17b and the V-grooves 8b and 12a is maintained. The heat-resistant shaft 8, adapter 12, and rotary shaft body 9 are fixed in a rotation direction with keys and the like (not illustrated). They are also fixed in a longitudinal direction with the screw 13, and in addition, with the above-mentioned mechanical means including the two-piece flange 16, two-piece cylinder 17, and cap 18. With this, even if these parts are heated to a high temperature, they are firmly and surely fixed in the longitudinal direction. In addition, removing the two-piece flange 16, two-piece cylinder 17, and cap 18 results in easily separating the parts concerned from one another in the longitudinal direction.

Around the adapter 12, there is arranged a shutter structure 20 fixed to a base 21. The shutter structure 20 includes a case 22, a pair of carbon plates 24 forming an intermediate space 23, and a ring spring 25 to upwardly bias the carbon plates 24. The ring spring 25 has a plurality of rings that are connected to one another at different circumferential positions so that the ring spring 25 bends at parts other than the connected positions. A lower end of the ring spring 25 is supported from below with an extension of the case 22, to apply force to the carbon plates 24 in a thickness direction and upwardly bias the carbon plates 24 toward the adapter 12.

Figure 5:
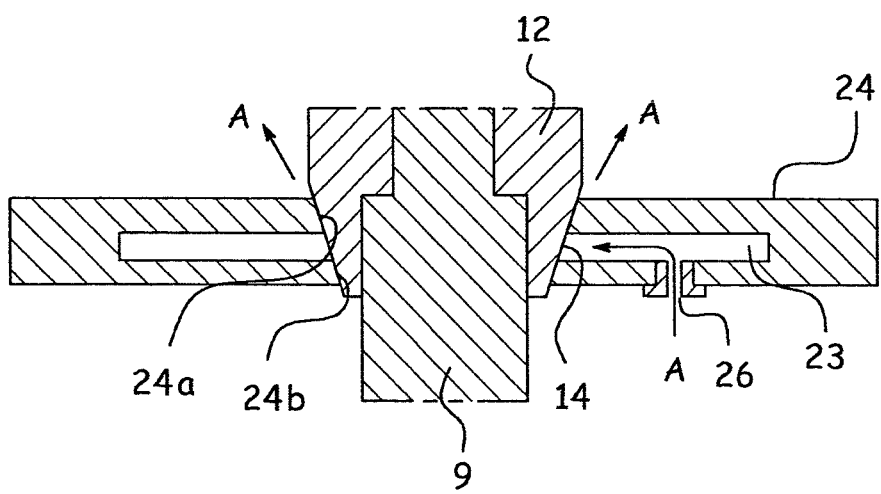
FIG. 5 is a sectional view illustrating the shutter structure.
Figure 6:
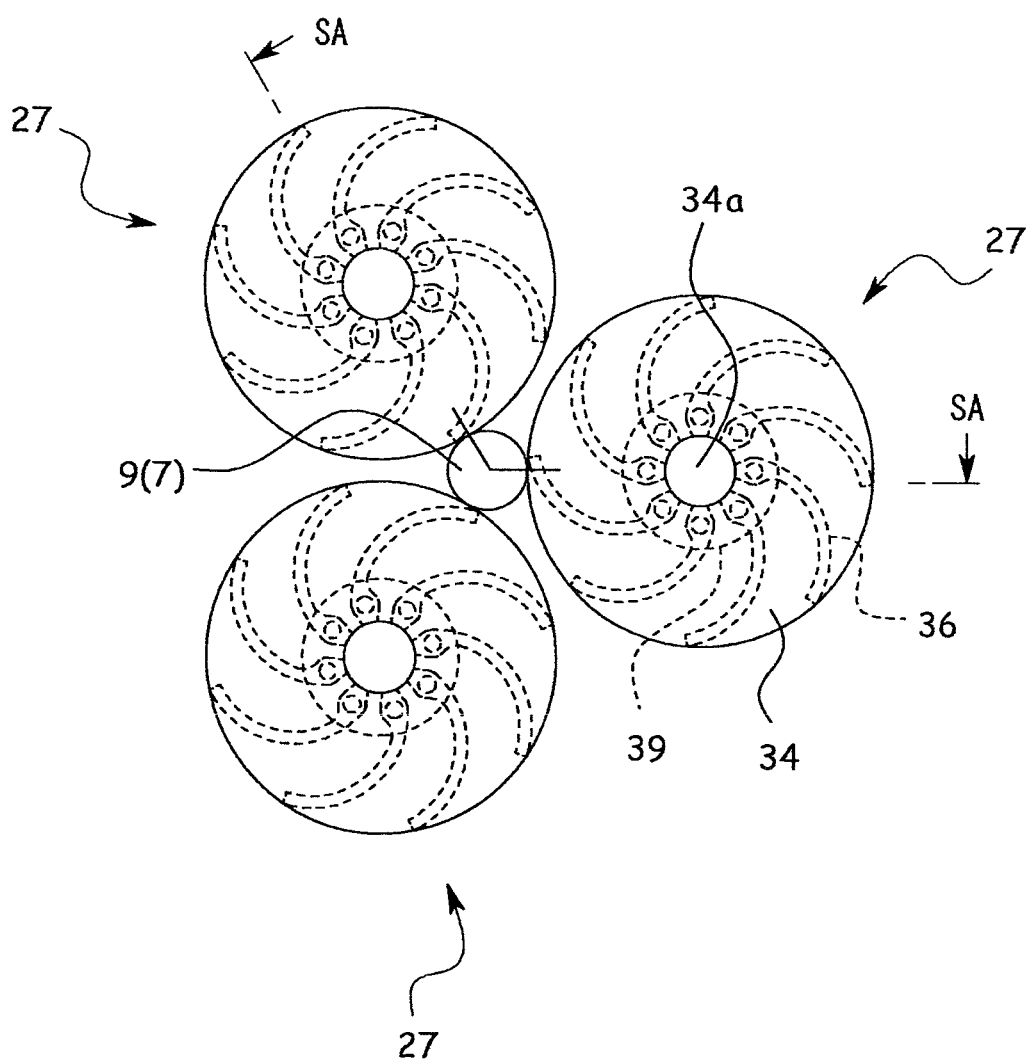
FIG. 6 is a plan view illustrating three disks of the heat-insulating bearing structure.

The carbon plates 24 have center holes 24a and 24b that are sloped to correspond to the tapered face 14 of the adapter 12 as illustrated in FIG. 5. A bottom face of the carbon plates 24 has a hole 26.

When the rotary shaft 7 is rotated, the center holes 24a and 24b of the carbon plates 24 turn at a high speed relative to the tapered face 14 of the adapter 12. The upper center hole 24a is larger in diameter than the lower center hole 24b, and therefore, even at the same rotation speed, the upper center hole 24a is greater in speed relative to the tapered face 14 and in centrifugal force than the lower center hole 24b. Accordingly, a minute gap between the upper center hole 24a and the tapered face 14 causes a larger pressure decrease as a larger pressure gradient to slightly pass air A from the space 23 toward the impeller 1. As the air A flows toward the impeller 1, air A is successively introduced through the hole 26 into the space 23.

Air A under the shutter structure 20 is introduced through the hole 26 into the space 23 and is passed from the space 23 through the minute gap between the upper center hole 24a and the tapered face 14 toward the impeller 1. In this way, the shutter structure 20 causes a one-way flow of air A from an area below the shutter structure 20 toward an area above the same, and therefore, heat is never carried with air A reversely from the impeller 1 toward the lower area.

For the rotary shaft body 9 below the shutter structure 20, there are arranged a set of three disks 27 and a set of three disks 28. A peripheral edge of each of the disks 27 and 28 is in contact with a circumferential side face of the rotary shaft body 9. The set of the disks 27 and the set of the disks 28 are vertically inverted with respect to each other. The disks 27 are supported with disk-supporting shafts 29, respectively, and the disks 28 are supported with the disk-supporting shafts 30, respectively, the shafts 29 and 30 being in parallel with the rotary shaft body 9 and being rotatably supported with bearings 32 with respect to a base 31. The lower disks 28 are in contact with a small-diameter part 33 of the rotary shaft body 9.

Figure 7:
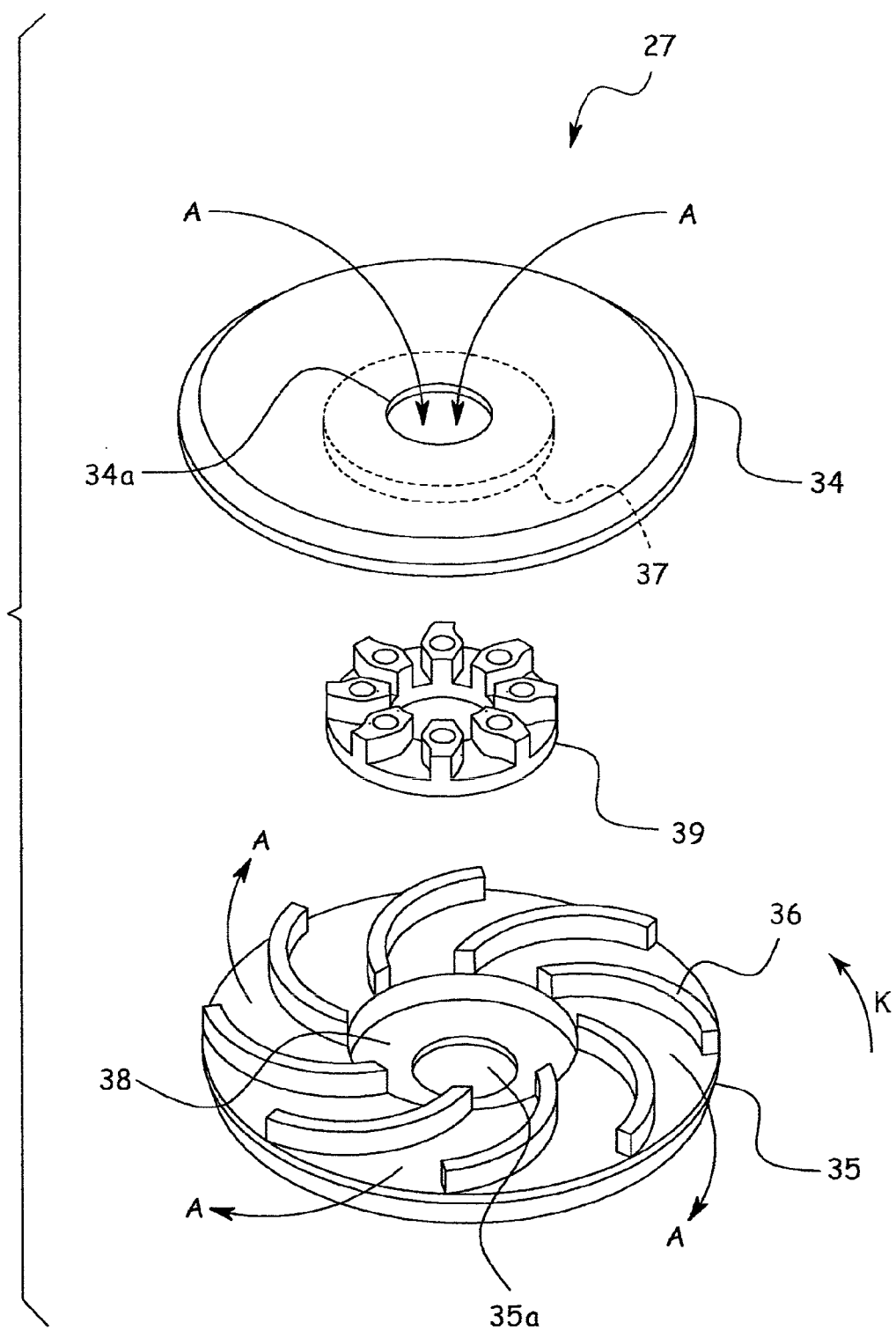
FIG. 7 is an exploded perspective view illustrating one of the disks.
Figure 8:
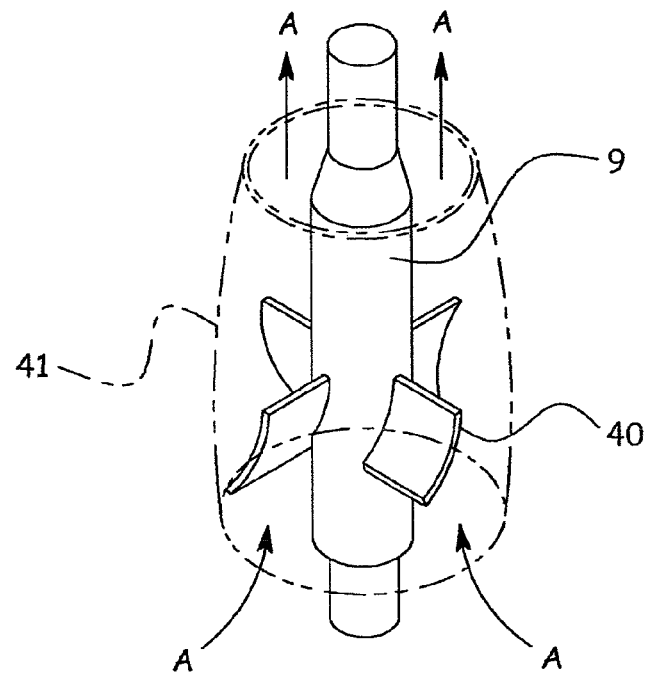
FIG. 8 is a perspective view illustrating vanes arranged on the rotary shaft.
Figure 9:
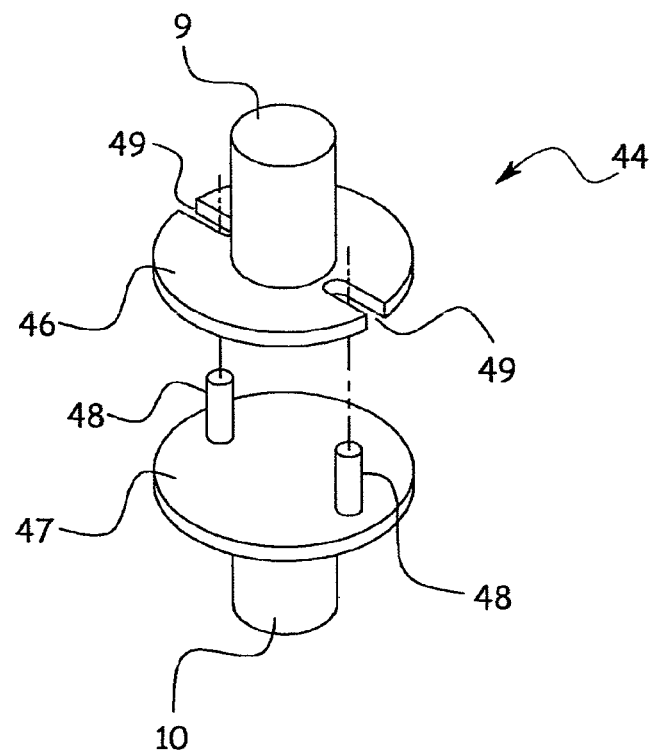
FIG. 9 is a perspective view illustrating a pin joint structure for a connection shaft of the rotary shaft.

The disks 27 and 28 have the same structure, and therefore, one of the upper disks 27 will be explained as a representative example with reference to FIG. 7.

The disk 27 has two circular plates 34 and 35 and fins 36 held between the circular plates 34 and 35. The lower circular plate 35 has a center hole 35a and the upper circular plate 34 has an intake hole 34a to draw in air A when rotated. The intake hole 34a is formed in a recess 37 formed in the upper circular plate 34 and the center hole 35a is formed in a recess 38 formed in the lower circular plate 35. The fins 36 are arranged around the recess 38 of the lower circular plate 35 and each fin 36 has a shape curving to clockwise direction as approaching to an outer end thereof.

The upper and lower circular plates 34 and 35 are laid one on another with a center member 39 fitted in the recesses 37 and 38. When laid one on another, the circular plates 34 and 35 are spaced from each other by the thickness of the fins 36. With the center member 39 fitted in the recesses 37 and 38, the circular plates 34 and 35 are aligned with each other to cause no positional displacement. To the center hole 35a of the lower circular plate 35, the disk-supporting shaft 29 is fixed. The center member 39 has a center hole so that the intake hole 34a of the upper circular plate 34 communicates through the center member 39 with spaces between the fins 36. Functions of the disks 27 and 28 will be explained later.

The rotary shaft body 9 has vanes 40 between the upper set of the disks 27 and the lower set of the disks 28. The vanes 40 are covered with a cylindrical hood 41 fixed through a means (not illustrated) to the base 31. When rotated, the vanes 40 produce a flow of air A along the rotary shaft body 9.

The connection shaft 10 of the rotary shaft 7 is rotatably supported by bearings 42 with respect to a base 43. The connection shaft 10 has upper and lower pin joint structures 44 and 45. Each of the pin joint structures 44 and 45 has a pair of flanges 46 and 47. The flange 46 has two cuts 49 and the flange 47 has two pins 48. The pins 48 engage with the cuts 49 to transmit rotation. The pin joint structures 44 and 45 each have a small contact area to increase thermal resistance, thereby preventing heat of the rotary shaft body 9 from being transmitted through the connection shaft 10 to the motor M.

Operation of the embodiment will be explained.
Heat-Resistant Shaft

The heat-resistant shaft 8 and the periphery thereof are close to the impeller 1, and therefore, are heated to a high temperature. Accordingly, the heat-resistant shaft 8 must surely be fixed. Fixation thereof in a rotation direction is achieved by, for example, key engagement. Fixation thereof in a longitudinal direction has a problem. Due to the high temperature, the screw 13 is insufficient for surely fixing the heat-resistant shaft 8 in the longitudinal direction. For this, the embodiment employs the two-piece flange 16, two-piece cylinder 17, and cap 18 to realize mechanical connection. Namely, engagement between the V-grooves 8a, 8b, and 12a and the hooks 16a, 17a, and 17b surely fixes the heat-resistant shaft 8 in the longitudinal direction. The two-piece flange 16 and two-piece cylinder 17 easily allow release of the longitudinal fixation of the heat-resistant shaft 8.

Shutter structure

Air around the impeller 1 is at a high temperature, and therefore, it is preferable not to move the high-temperature air downward. For this, the embodiment arranges the shutter structure 20 to block the high-temperature air that is basically present in an upper space around the impeller 1 from moving downward. When the tapered face 14 of the adapter 12 turns, centrifugal force is generated to create an upward flow of air A through the minute gap between the tapered face 14 and the upper center hole 24a of the shutter structure 20, thereby causing a pressure drop, i.e. pressure gradient, to decrease an air pressure on the top face side of the center hole 24a lower than that on the bottom face side thereof. This vertical pressure gradient perfectly prevents air A from moving downward through the minute gap, thereby protecting the structure below the shutter structure 20 from heat. The center hole 24b of the shutter structure 20 also causes a pressure decrease. This is weaker than that of the center hole 24a, and therefore, the space 23 in the shutter structure 20 also causes a pressure decrease to pass no air from the space 23 toward the bottom side of the shutter structure 20.

Heat-Insulating Structure With Disks

The upper set of the disks 27 and the lower set of the disks 28 are parts that mainly support the rotary shaft 7 and are strongly in contact with the rotary shaft 7. Heat transfer prevention at these parts is the most important issue to improve an overall heat-insulating capability.

The peripheral edges of the upper and lower disks 27 and 28 are in contact with the rotary shaft body 9 from three directions, to surely radially support the rotary shaft body 9. The lower disks 28 are in contact with the small-diameter part 33 of the rotary shaft body 9, to surely support the rotary shaft body 9 in thrust directions.

According to the supporting structure with the disks 27 and 28, the peripheral edges of the disks 27 and 28 come into contact with the rotary shaft body 9 from three directions. Although the contact between the disks 27 and 28 and the rotary shaft body 9 is strong, each contact state between them is nearly a point contact or a line contact that involves a small contact area to realize large thermal resistance and small heat conduction. Due to this, even if the rotary shaft body 9 is heated to a high temperature, the disks 27 and 28 are hardly influenced by the heat, to ensure a secure rotational support.

When the rotary shaft body 9 is rotated, the disks 27 and 28 are passively rotated accordingly. When the disks 27 and 28 are rotated counterclockwise (K), surrounding air A is introduced from the central intake hole 34a of the circular plate 34 of each disk into spaces between the circular plates 34 and 35 and the introduced air is moved by the rotated curved fins 36 and blown from the peripheral edge of each disk toward the contact part between the disk and the rotary shaft body 9, thereby cooling the contact part. This prevents heat conduction from the rotary shaft body 9 to each disk through the contact part. Surrounding air A is first passed through the spaces between the circular plates 34 and 35 of each disk and is then blown from the peripheral edge of the disk. Namely, the introduced air is not dispersed but is collectively blown out of the peripheral edge of each disk, to surely cool the contact part between each of the disks 27 and 28 and the rotary shaft body 9.

Cooling By Vanes

When the rotary shaft body 9 is rotated, the vanes 40 of the rotary shaft body 9 rotate to generate a flow of air A along the rotary shaft body 9. This airflow cools the rotary shaft body 9 and is blown toward the contact part between each of the upper disks 27 and the rotary shaft body 9, to cool the contact part. The vanes 40 are covered with the cylindrical hood 41, and therefore, the airflow generated by the vanes 40 runs along the rotary shaft body 9 and is efficiently blown toward the contact part between each disk 27, 28 and the rotary shaft body 9.

Pin Joint Structure

The connection shaft 10 adjacent to the motor M is provided with the two pin joint structures 44 and 45 to surely block face-to-face heat conduction from the rotary shaft body 9. In each of the pin joint structures 44 and 45, the pins 48 and cuts 49 engage with each other to transmit rotation from one to another. A contact area between the pins 48 and the cuts 49 is small to increase thermal resistance. Namely, the pin joint structures 44 and 45 surely transmit torque from the motor M to the rotary shaft body 9 but hardly transmit heat from the rotary shaft body 9 to the motor M. Consequently, the pin joint structures 44 and 45 protect the motor M from heat.

According to the embodiment mentioned above, the rotary shaft 7 is vertically set and the impeller 1 is arranged at an upper end of the rotary shaft 7. Instead, the rotary shaft 7 may be horizontally or obliquely set and the impeller 1 may be fixed to any end of the rotary shaft 7.

According to the embodiment mentioned above, each of the disks 27 and 28 has the two circular plates 34 and 35 and the fins 36 arranged in a space between the circular plates 34 and 35. Instead, each disk may have a single circular plate 35 with fins 36 arranged on one face thereof.

In this way, the heat-insulating bearing structure according to the present invention supports a rotary shaft with the use of three disks whose peripheral edges come into contact with a circumferential side face of the rotary shaft from three directions. A contact area between the rotary shaft and each disk is small, and therefore, heat conduction from the rotary shaft to each disk is small. Without water cooling, this bearing structure is able to surely support the rotary shaft that is heated to a high temperature. Each disk is provided with fins so that, when rotated, the fins draw in surrounding air and blow out the air from the peripheral edge of the disk toward a contact part between the disk and the rotary shaft. This results in cooling the contact part and surely supporting the rotary shaft. This cooling scheme utilizes rotation of the rotary shaft without needing a drive unit such as a motor for rotating the disks, thereby improving reliability.

According to the present invention, each of the disks has two circular plates and fins held between the circular plates. One of the circular plates is provided with an intake hole. When the disks are rotated, surrounding air is drawn through the intake hole into a space in each disk and the drawn air is blown outside from the peripheral edge of the disk. Namely, the drawn air is not dispersed but is collectively blown from the peripheral edge of the disk toward the contact part between the disk and the rotary shaft, thereby surely cooling the contact part.

According to the present invention, the peripheral edge of each disk is in contact with a small-diameter part of the rotary shaft. Accordingly, the three disks are able to positionally restrict the rotary shaft not only in radial directions but also in thrust directions.

What is claimed is:

1. A heat-insulating bearing structure for supporting a rotary impeller shaft provided with, at one end thereof, an impeller that comes into contact with high-temperature gas, the heat-insulating bearing structure comprising:

a set of three disks, a peripheral edge of each of the three disks is in contact with a circumferential side face of the rotary impeller shaft from one of three different directions, each of the three disks being rotatably supported by a respective disk-supporting shaft that extends parallel to the rotary impeller shaft, each of the disks having fins to radially blow out atmospheric gas from the peripheral edge of the disk when the disk is rotated.

2. The heat-insulating bearing structure of claim 1, wherein each of the disks includes two circular plates that hold the fins between them, a center of one of the circular plates being fixed to the disk-supporting shaft and a center of the other of the circular plates being provided with an intake hole to draw in atmospheric gas when the disk is rotated.

3. The heat-insulating bearing structure of claim 1, wherein the rotary impeller shaft is provided with a predetermined portion having a diameter smaller than a diameter of an other portion of the rotary impeller shaft at a location corresponding to the peripheral edges of the disks so that the peripheral edges of the disks come into contact with the predetermined portion of the rotary impeller shaft to restrict an axial position of the rotary impeller shaft.

* * * * *